US008922055B2

(12) United States Patent
Chien et al.

(10) Patent No.: US 8,922,055 B2
(45) **Date of Patent: *Dec. 30, 2014**

(54) DRIVING CIRCUIT AND METHOD FOR DRIVING CURRENT-DRIVEN DEVICES AND ELECTRONIC DEVICE APPLYING THE SAME

(75) Inventors: Feng-Wei Chien, Hsinchu (TW); Tsung-Hau Chang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 653 days.

This patent is subject to a terminal disclaimer.

(21) Appl. No.: 13/080,650

(22) Filed: Apr. 5, 2011

(65) Prior Publication Data

US 2011/0181203 A1 Jul. 28, 2011

Related U.S. Application Data

(63) Continuation of application No. 12/554,855, filed on Sep. 4, 2009, now Pat. No. 7,936,090.

(30) Foreign Application Priority Data

Dec. 23, 2008 (TW) .............................. 97150324 A

(51) Int. Cl.
*H02J 1/00* (2006.01)
*H05B 33/08* (2006.01)

(52) U.S. Cl.
CPC ........ *H05B 33/0815* (2013.01); *H05B 33/0827* (2013.01)
USPC ................................ 307/31; 307/39; 307/131

(58) Field of Classification Search
USPC ........... 307/31, 38, 39, 125, 130, 131, 36, 40, 307/41, 134, 135
See application file for complete search history.

(56) References Cited

U.S. PATENT DOCUMENTS

| | | | | | |
|---|---|---|---|---|---|
| 5,289,112 | A * | 2/1994 | Brown et al. | ................. | 323/315 |
| 5,900,680 | A | 5/1999 | Prey | | |
| 6,161,910 | A * | 12/2000 | Reisenauer et al. | .......... | 315/309 |
| 6,952,083 | B2 * | 10/2005 | Fukuzako | .................. | 315/169.1 |
| 7,936,090 | B2 * | 5/2011 | Chien et al. | ..................... | 307/31 |
| 2005/0104542 | A1 * | 5/2005 | Ito et al. | ........................ | 315/291 |
| 2009/0315481 | A1 * | 12/2009 | Zhao | ............................. | 315/297 |
| 2010/0072922 | A1 * | 3/2010 | Szczeszynski et al. | ........ | 315/297 |
| 2010/0134040 | A1 * | 6/2010 | Elder | ............................ | 315/294 |
| 2010/0283322 | A1 | 11/2010 | Wibben | | |
| 2010/0295472 | A1 | 11/2010 | Wibben et al. | | |

* cited by examiner

*Primary Examiner* — Fritz M Fleming
(74) *Attorney, Agent, or Firm* — Rabin & Berdo, P.C.

(57) ABSTRACT

Provided is a light emitting diode (LED) driving circuit for driving a plurality of LED groups. The LED driving circuit includes: a voltage converter, for converting an input voltage into an output voltage, the output voltage coupled to a respective first terminal of each of the LED groups; and a controller, coupled to the voltage converter for controlling the voltage converter, the controller including a plurality of output channel terminals respectively corresponding to a plurality of output channels, one or more of the output channels are enabled and one or more of the output channels are disabled. One or more of the output channel terminals corresponding to the one or more enabled output channels are coupled to second terminals of corresponding ones of the LED groups, and one or more of the output channel terminals corresponding to the one or more disabled output channels are coupled to a reference voltage.

48 Claims, 5 Drawing Sheets

DRIVING CIRCUIT AND METHOD FOR DRIVING CURRENT-DRIVEN DEVICES AND ELECTRONIC DEVICE APPLYING THE SAME

This application is a continuation application of U.S. patent application Ser. No. 12/554,855 filed on Sep. 4, 2009, which claims the benefit of Taiwan application Serial No. 97150324, filed Dec. 23, 2008. These related applications are incorporated herein by reference.

BACKGROUND OF THE APPLICATION

1. Field of the Application

The application relates in general to a LED (Light Emitting Diode) driver of current-driven devices, and more particularly, to a driving circuit of current-driven devices, which may determine whether the output channel is available for power-saving and control the output voltage accurately.

2. Description of the Related Art

A light emitting diode (LED) has advantages of low power consumption, long lifetime, small volume and short response time. Therefore, the LED increasingly is adopted on the conventional lamp bulb. Besides, the LED may also be applied in domestic electric appliances and used as a backlight source for a notebook computer. Compared with a notebook computer using cold-cathode-fluorescence lamps (CCFLs), the notebook compute using LEDs may save more power and elongate lifetime of the battery.

This kind of electronic device (such as a notebook computer) includes an LED driving circuit for driving the LEDs. Normally, the electronic device is configured with a number of LED channels, but sometimes, a part of which are not used and set at a floating state. If there is no good mechanism for detecting which LED channels are at floating state and accordingly controlling the floating-state LED channels, the floating-state LED channels easily cause unnecessary power consumptions, influence conversion efficiency of the whole circuit and increase power consumption, or even cause an error determination and operation of the DC-DC converter.

For this reason, an example of the application provides a driving circuit which may detect whether the LED channels are enabled or disabled at the initiation. Accordingly, the LED driver may turn off the disabled LED channels and ignore the feedback status thereof in order to save power, increase conversion efficiency of the whole circuit, and reduce the error determination to make the DC-DC converter in normal operation.

SUMMARY

The application is directed to a driving circuit and method for driving a number of current-driven devices. The driving circuit and method may determine whether the output channels are enabled or disabled, and turns off the according output current sources related to disabled output channels to achieve a power-saving function.

The application is directed to a driving circuit and method for driving a number of current-driven devices. The driving circuit and method may determine whether the output channels are enabled or disabled, and ignore the status of the disabled output channels to control the output voltage accurately.

An example of the present application provides a light emitting diode (LED) driving circuit for driving a plurality of LED groups, the LED driving circuit including: a voltage converter, for converting an input voltage into an output voltage, the output voltage coupled to a respective first terminal of each of the LED groups; and a controller, coupled to the voltage converter for controlling the voltage converter, the controller including a plurality of output channel terminals respectively corresponding to a plurality of output channels, one or more of the output channels are enabled and one or more of the output channels are disabled. One or more of the output channel terminals corresponding to the one or more enabled output channels are coupled to second terminals of corresponding ones of the LED groups, and one or more of the output channel terminals corresponding to the one or more disabled output channels are coupled to a reference voltage Another example of the present application provides a light emitting diode (LED) driving circuit for driving a plurality of LED groups, the LED driving circuit including: a voltage converter, for converting an input voltage into an output voltage, the output voltage coupled to a respective first terminal of each of the LED groups; and a controller, coupled to the voltage converter for controlling the voltage converter and including a plurality of output channel terminals respectively corresponding to a plurality of output channels. At an initiation of the LED driving circuit, the controller determines whether the output channels are enabled or disabled, respectively, and controls the voltage converter to generate the output voltage based on a result of the determination.

Yet another example of the present application provides a light emitting diode (LED) driving method, including: converting an input voltage into an output voltage for coupling to a respective first terminal of each of a plurality of LED groups; and at an initiation of the LED driving circuit having a plurality of output channel terminals respectively corresponding to a plurality of output channels, determining whether the output channels are enabled or disabled, respectively, and controlling the converting step to generate the output voltage based on a result of the determination.

Still yet another example of the present application provides a light emitting diode (LED) driving method, including: at an initiation of a LED driving circuit having a plurality of output channel terminals respectively corresponding to a plurality of output channels, determining whether the output channels of the LED driving circuit are enabled or disabled respectively; and turning off output currents of one or more disabled ones of the output channels based on a result of the determination.

Still yet another example of the present application provides an electronic device, including: a plurality of light emitting diode (LED) groups; and a LED driving circuit for driving the LED groups, by converting an input voltage into an output voltage for coupling to a respective first terminal of each of the LED groups, and the LED driving circuit including a plurality of output channel terminals respectively corresponding to a plurality of output channels, one or more of the output channels are enabled and one or more of the output channels are disabled. One or more of the output channel terminals corresponding to the one or more enabled output channels are coupled to second terminals of corresponding ones of the LED groups, and one or more of the output channel terminals corresponding to the one or more disabled ones of the output channels are coupled to a reference voltage.

Still yet another example of the present application provides an electronic device including: a plurality of light emitting diode (LED) groups; and a LED driving circuit for driving the LED groups, by converting an input voltage into an output voltage for coupling to a respective first terminal of each of the LED groups, and the LED driving circuit including a plurality of output channel terminals respectively corresponding to a plurality of output channels. At an initiation of the LED driving circuit, the LED driving circuit determines whether the output channels are enabled or disabled, respectively and generates the output voltage based on a result of the determination.

The application will become apparent from the following detailed description of the non-limiting embodiments. The following description is made with reference to the accompanying drawings.

DETAILED DESCRIPTION OF EMBODIMENTS OF THE APPLICATION

In the embodiments of the application, it is determined whether the output channels are enabled or disabled. The current output sources of the disabled output channels will be turned off for power-saving. Besides, in voltage conversion, the status of the disabled output channels is ignored to accurately control the voltage conversion.

First Embodiment of the Application

Figure 1:
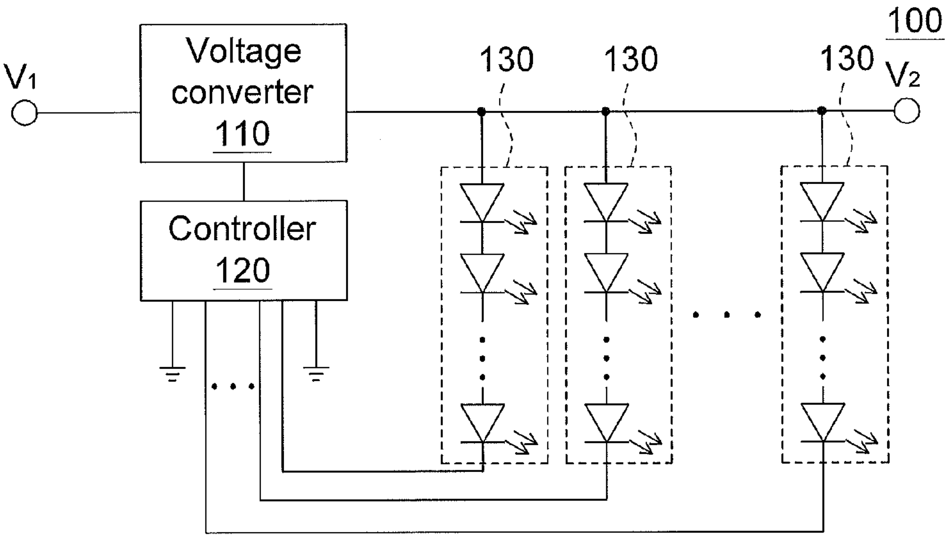
FIG. 1 is a block diagram of an LED driving circuit according to a first embodiment of the application.

FIG. 1 is a block diagram of an LED driving circuit according to a first embodiment of the application. As shown in FIG. 1, the LED driving circuit 100 of the first embodiment, which can be disposed in an electronic device, at least includes a voltage converter 110 and a controller 120. The LED driving circuit 100 is for driving a number of LED groups 130.

The voltage converter 110 converts an input voltage V1 into an output voltage V2. The voltage conversion performed by the voltage converter 110 may be voltage boosting, voltage bucking or voltage boost-bucking. One of features of the voltage converter 110 lies in that the output voltage V2 may supply currents to drive loads, such as the LED groups 130, and the output voltage V2 may be controlled accurately. In the LED driving circuit 100, the output terminal of the voltage converter 110 is coupled to the LED groups 130 for supplying the output voltage V2 to drive the LED groups 130.

The controller 120 has a number of output channel terminals. All, some or none of the output channel terminals may be coupled to the LED groups 130, and all, some or none of the output channel terminals may be coupled to a ground voltage. The controller 120 may further include a constant current source for driving the LED groups 130. The controller 120 transmits (i.e. feeds back) the status of the LED groups 130 to the voltage converter 110 and accordingly controls the voltage converter 110, such that the voltage converter 110 may generate the output voltage V2. The feedback mechanism enables the LED driving circuit 100 to drive the LED groups 130 stably. Further, the controller 120 and the voltage converter 110 may be integrated into a chip. The control mode of the controller 120 may be voltage mode/current mode pulse width modulation (PWM), pulse frequency modulation (PFM), or a combination thereof, or other control modes suitable for controlling the voltage converter 110.

At initiation of the LED driving circuit 100, the controller 120 may determine which output channel terminals are coupled to the LED groups 130 (i.e. which output channels are enabled) and which output channel terminals are not coupled to the LED groups 130 (i.e. which output channels are disabled). Then, the controller 120 may give a corresponding response to the disabled output channels. When the LED driving circuit 100 is already set but has not started to operate, the controller 120 may detect the disabled output channel(s), turn off the disabled output channel(s) and ignore the status of the feedback terminal(s) thereof for power-saving.

Figure 2A:
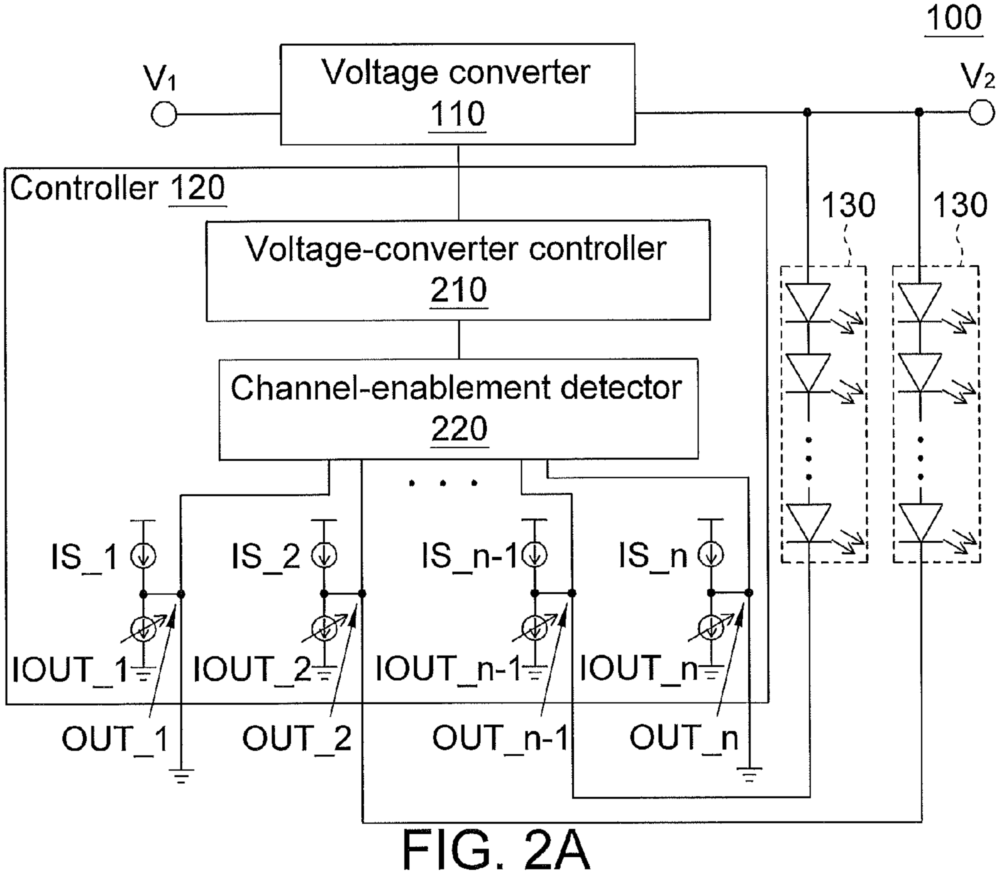
FIG. 2A is a detailed block diagram of the controller according to the first embodiment of the application.

FIG. 2A shows a detailed block diagram of the controller according to the first embodiment of the application. As shown in FIG. 2A, the controller 120 includes a voltage-converter controller 210, a channel-enablement detector 220, detecting current sources IS_1~IS_n, and current output sources IOUT_1~IOUT_n. The detecting current sources IS_1~IS_n are current sources for instance.

When the LED driving circuit 100 has not started to operate, the output voltage V2 of the voltage converter 110 has not been lifted to a high voltage and the current output sources IOUT_1~IOUT_n are temporarily in non-conductive state. The output channel terminals OUT_1~OUT_n are respectively coupled to the detecting current sources IS_1~IS_n. It may be determined which output channel is enabled based on the voltages of the output channel terminals OUT_1~OUT_n. One LED group 130 and a corresponding current output source IOUT form an output channel.

Figure 3A:
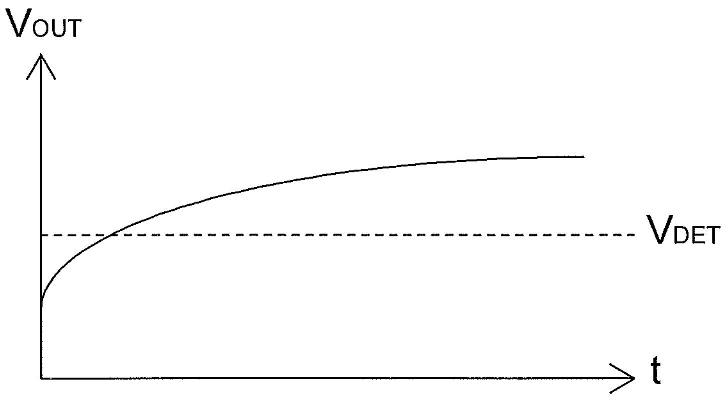
FIG. 3A is a waveform diagram at the enabled output channel according to the first embodiment of the application.
Figure 3B:
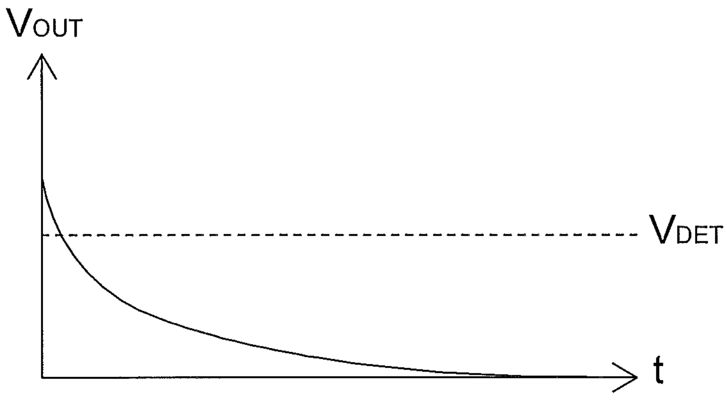
FIG. 3B is a waveform diagram at the disabled output channel according to the first embodiment of the application.

Determining if the output channel is enabled or disabled may be understood by referring to FIGS. 3A and 3B. FIGS. 3A and 3B respectively show waveform diagrams of the voltages at the output channel terminals according to the first embodiment of the application. FIG. 3A shows the waveform diagram of the enabled output channel terminals while FIG. 3B shows the waveform diagram of the disabled output channel terminals. The voltages at the output channel terminals may also be referred as voltages of the output channels.

The voltages of the output channels are unknown because, at the beginning, all output channels are non-conductive. At initiation, the parasitic capacitor of the output channel terminal OUT is charged by the detecting current source IS. If the output channel is enabled (i.e. coupled to the LED groups), under the charging of the detecting current source IS, the output channel terminal OUT is charged to have a voltage higher than a detection voltage $V_{DET}$, as shown in FIG. 3A. Therefore, if the voltage at the output channel terminal OUT is higher than the detection voltage $V_{DET}$ after a period of time, the channel-enablement detector 220 may determine that the corresponding output channel is at an enabled state. The setting of the detection voltage $V_{DET}$ is related to the charging ability of the detecting current source IS, and thus the value of the detection voltage $V_{DET}$ may be set according to the charging ability of the detecting current source IS in practical application.

Conversely, when the output channel is unused (disabled), owing that the output channel is coupled to a low ground voltage (GND), even under charging of the detecting current source IS, the corresponding output channel terminal will still be pulled down to the low voltage and will not be charged to have a voltage higher than the detection voltage $V_{DET}$, as shown in FIG. 3B. After a period of time, if the channel-enablement detector 220 detects and determines that the output channel terminal has a voltage lower than the detection voltage $V_{DET}$, the corresponding output channel is determined to be disabled.

Figure 2B:
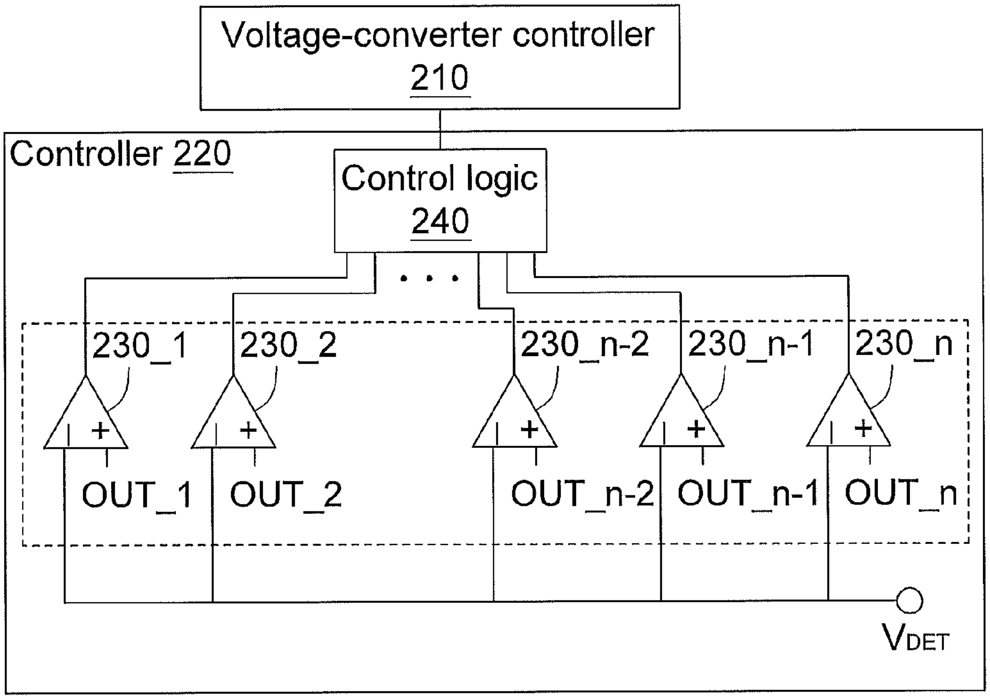
FIGS. 2B and 2C are two examples of the channel-enablement detector according to the first embodiment of the application.
Figure 2C:
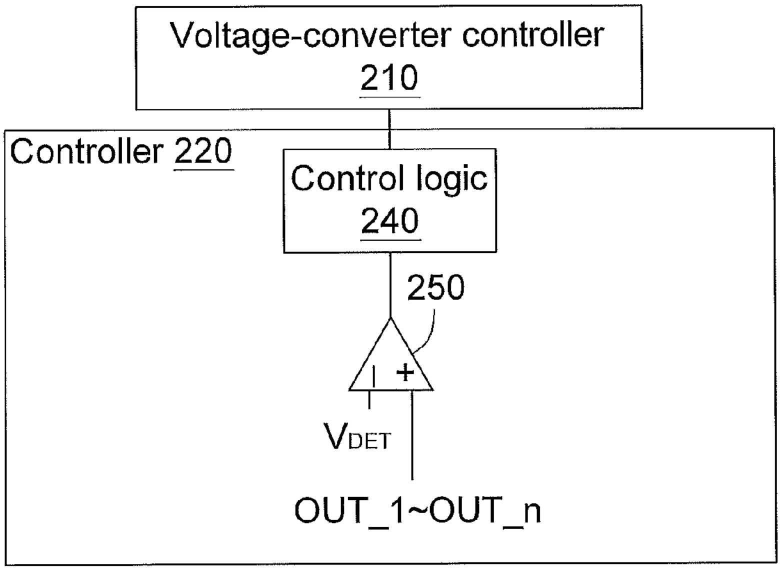

Referring to FIGS. 2B and 2C, two examples of the channel-enablement detector 220 according to the first embodiment of the application are shown. As shown in FIG. 2B, the channel-enablement detector 220 at least includes a number of comparators 230_1~230_n and a control logic 240. The comparators 230_1~230_n are used for comparing the voltages of the output channel terminals with the detection voltage $V_{DET}$. The comparison result of the comparators is transmitted to the control logic 240. Besides, as shown in FIG. 2C, by time division multiple access concept, the channel-enablement detector 220 may detect whether the channel is disabled by using one comparator 250.

If the comparison result shows some of the output channels are disabled, the control logic 240 ignores the status of the disabled output channels and turns off the corresponding current output sources IOUT of the disabled output channels for power-saving.

Besides, the control logic 240 selects a minimum value from the voltages of the enabled output channel terminals (i.e. a smallest voltage value higher than the detection voltage $V_{DET}$) and transmits the minimum value to the voltage-converter controller 210. The voltage-converter controller 210 controls the voltage-converting operation of the voltage converter 110 such that the voltage converter 110 may generate the output voltage V2.

After the initial detection ends, the detecting current sources (current sources) IS_1~IS_n are transformed into a power-off state and the current output sources IOUT_1~IOUT_n corresponding to the enabled output channels are transformed from a power-off state into a power-on state. The output voltage V2 of the voltage converter 110 reaches a stable voltage such that the LED groups 130 are completely turned on, and at the time, the controller 120 reaches a stable state.

Second Embodiment of the Application

Figure 4:
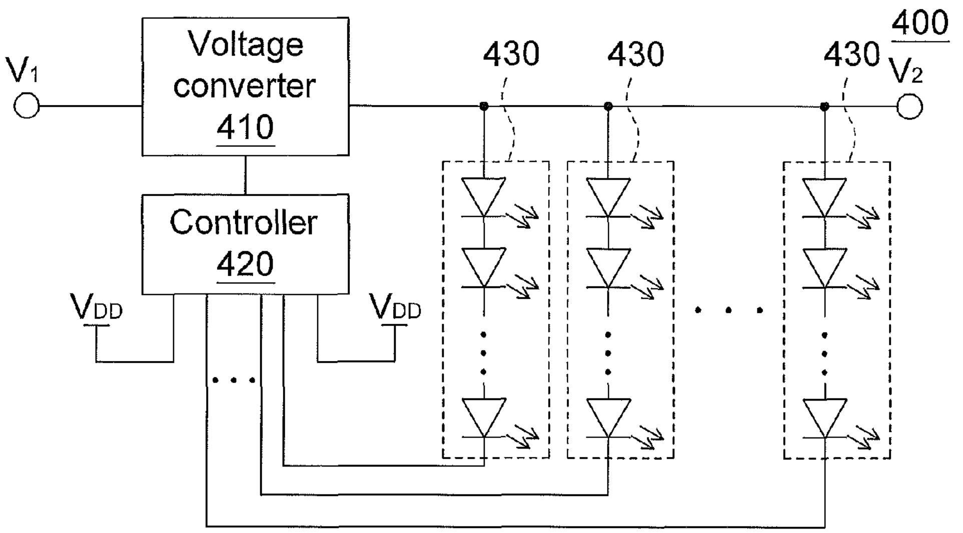
FIG. 4 is a block diagram of an LED driving circuit according to a second embodiment of the application.

FIG. 4 is a block diagram of an LED driving circuit according to a second embodiment of the application. As shown in FIG. 4, the LED driving circuit 400 of the second embodiment at least includes a voltage converter 410 and a controller 420. The LED driving circuit 400 is for driving a number of LED groups 430. The operation of the voltage converter 410 is similar to that of the voltage converter 110 and thus any detail is not necessarily given here.

The controller 420 has a number of output channel terminals. All, some or none of the output channel terminals may be coupled to the LED groups 430, and all, some or none of the output channel terminals may be coupled to a high voltage VDD. Basically, the controllers 420 and 120 have similar operation principles. The following description is provided to illustrate their difference.

Similarly, at the initiation of the LED driving circuit 400, the controller 420 may determine which output channel terminals are coupled to the LED groups 430 (i.e. which output channels are enabled) and which output channel terminals are coupled the high voltage VDD (i.e. which output channels are disabled). Then, the controller 420 may give a corresponding response to the disabled output channels. When the LED driving circuit 400 is set but has not started to operate, the controller 420 may detect the disabled output channel(s), turn off the disabled output channel(s) and ignore the status of the feedback terminal thereof for power-saving.

Figure 5:
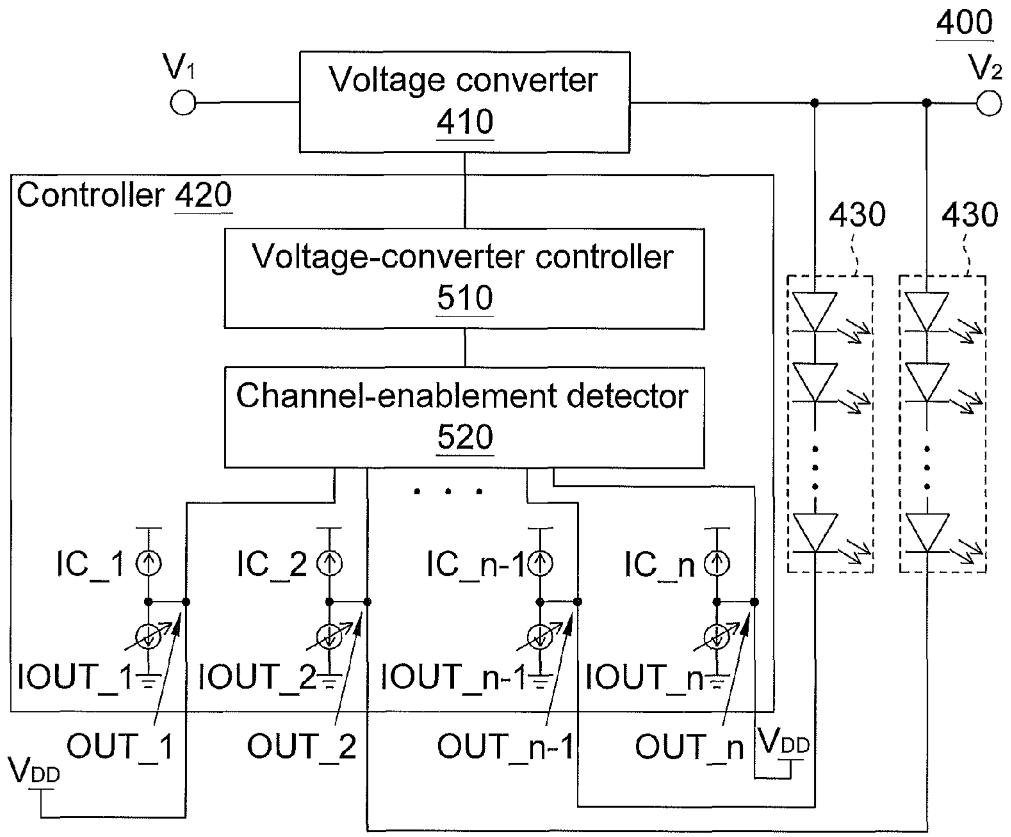
FIG. 5 is a detailed block diagram of the controller according to the second embodiment of the application.

FIG. 5 shows a detailed block diagram of the controller according to the second embodiment of the application. As shown in FIG. 5, the controller 420 includes a voltage-converter controller 510, a channel-enablement detector 520, detecting current sources IC_1~IC_n, and current output sources IOUT_1~IOUT_n. The detecting current sources IC_1~IC_n are current sinks for instance.

When the LED driving circuit 400 has not started to operate, the output voltage V2 of the voltage converter 410 has not been lifted to a high voltage and the current output sources IOUT_1~IOUT_n are temporarily set in a non-conductive state. The output channel terminals OUT_1~OUT_n are respectively coupled to the detecting current sources IC_1~IC_n. It may be determined which output channel is enabled based on the voltages of the output channel terminals OUT_1~OUT_n.

Figure 6A:
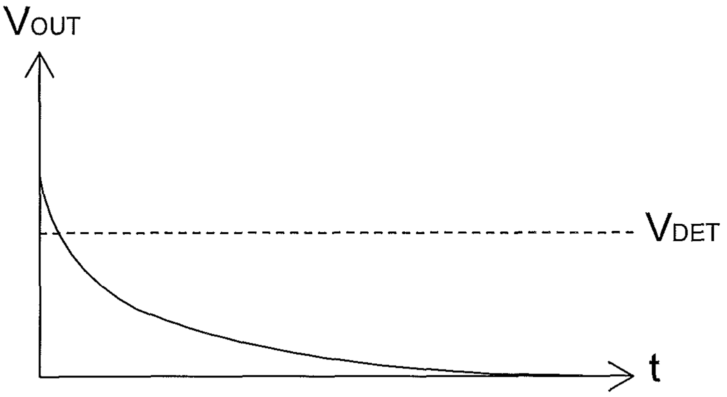
FIG. 6A is a waveform diagram at the enabled output channel according to the second embodiment of the application.
Figure 6B:
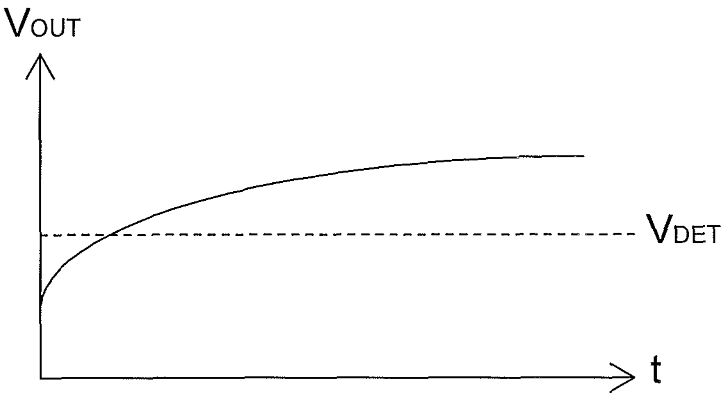
FIG. 6B is a waveform diagram at the disabled output channel according to the second embodiment of the application.

Determining if the output channel is enabled or disabled may be understood by referring to FIGS. 6A and 6B. FIGS. 6A and 6B respectively show waveform diagrams of the voltages at the output channel terminals according to the second embodiment of the application. FIG. 6A shows the waveform diagram of the enabled output channel terminals while FIG. 6B shows the waveform diagram of the disabled output channel terminals. The voltages at the output channel terminals may also be called voltages of the output channels.

The voltages of the output channels are unknown because at the beginning, the output channels are non-conductive. At initiation, the parasitic capacitor of the output channel terminal OUT is discharged by the detecting current source IC. If the output channel is enabled (i.e. coupled to the LED groups), under the discharging of the detecting current source IC, the output channel terminal OUT is discharged to have a voltage lower than a detection voltage $V_{DET}$, as shown in FIG. 6A. Therefore, if the voltage at the output channel terminal OUT is lower than the detection voltage $V_{DET}$ after a period of time, the channel-enablement detector 520 may determine that the corresponding output channel is at an enabled state.

Conversely, when the output channel is unused (disabled), owing that the unused output channel is coupled to the high VDD, even under discharging of the detecting current source IC, the corresponding output channel terminal will still be pulled up to the high voltage and will not be discharged to have a voltage lower than the detection voltage $V_{DET}$, as shown in FIG. 6B. After a period of time, when the channel-enablement detector 520 detects and determines the output channel terminal has a voltage higher than the detection voltage $V_{DET}$, the corresponding output channel is determined to be disabled. Basically, the structure of the channel-enablement detector 520 is similar to that of the channel-enablement detector 220. The setting of the detection voltage $V_{DET}$ is related to the discharging ability of the detecting current source IC, and thus the value of the detection voltage $V_{DET}$ may be set according to the discharging ability of the detecting current source IC in practical application.

If some of the output channels are detected to be disabled, the controller 420 ignores the status of the disabled output channels, turns off the current output sources of the disabled output channels for power-saving.

After the initial detection ends, the detecting current sources (current sinks) IC_1~IC_n are into a power-off state and the current output sources IOUT_1~IOUT_n corresponding to the enabled output channels are into a power-on state. The output voltage V2 of the voltage converter 410 reaches a stable voltage such that the LED groups 430 are completely turned on, and at the time, the controller 420 reaches a stable state.

Additionally, embodiments of the application are not limited to being applied to the LED driving circuit. For example, other types of current-driven devices may also take place of the LED groups and the current-driven devices may be accurately driven by using the above architecture.

According to the above-mentioned embodiments of the application, the disabled output channel is coupled to the reference voltage (GND or VDD) while the enabled output channel is coupled to the LED groups. Therefore, under influence of the detecting current sources in the controller, after the circuit is initiated for a period of time, if the voltage of an output channel terminal is changed, it implies the corresponding output channel is enabled; conversely, if the voltage of an output channel terminal is not changed, it implies the corresponding output channel is disabled. By determining whether the output channel is enabled or disabled, the power-saving function may be achieved and the voltage conversion of the voltage converter may be accurately controlled.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A light emitting diode (LED) driving circuit for driving a plurality of LED groups, each LED group including one or more LEDs, the LED driving circuit comprising:

a voltage converter, for converting an input voltage into an output voltage, the output voltage coupled to a respective first terminal of each of the LED groups; and a controller, coupled to the voltage converter for controlling the voltage converter, the controller including a plurality of output channels respectively having a plurality of output channel terminals, wherein each of the output channel terminals is coupled to a respective second terminal of at least one of the LED groups or a reference voltage according to whether the corresponding output channel is used or unused, if the corresponding output channel is used, the output channel terminal thereof is coupled to the respective second terminal of the at least one LED group, and if the corresponding output channel is unused, the output channel thereof is coupled to the reference voltage;

wherein at an initiation of the LED driving circuit, before the LED driving circuit has started to operate, the controller detects whether the output channel terminals are coupled to the LED groups or to the reference voltage, respectively, and controls the voltage converter to generate the output voltage based on a result of the detection.

2. The LED driving circuit according to claim 1, wherein the controller ignores the one or more output channel terminals coupled to the reference voltage and controls the voltage converter to generate the output voltage based on respective voltages of the one or more output channel terminals coupled to the LED groups.

3. The LED driving circuit according to claim 2, wherein the controller controls the voltage converter to generate the output voltage based on a minimum value among the voltages of the one or more output channel terminals coupled to the LED groups.

4. The LED driving circuit according to claim 1, wherein at the initiation of the LED driving circuit, the controller further turns off output currents of the one or more output channel terminals coupled to the reference voltage based on the result of the detection.

5. The LED driving circuit according to claim 1, wherein the controller detects respective voltages of the output channel terminals so as to detect whether the output channel terminals are coupled to the LED groups or the reference voltage, respectively.

6. The LED driving circuit according to claim 1, wherein at the initiation of the LED driving circuit, the controller detects whether the output channel terminals are coupled to the LED groups or to the reference voltage, respectively, and turns off output currents of the one or more output channel terminals coupled to the reference voltage.

7. The LED driving circuit according to claim 6, wherein the controller detects respective voltages of the output channel terminals so as to detect whether the output channel terminals are coupled to the LED groups or the reference voltage, respectively.

8. The LED driving circuit according to claim 1, wherein the controller further comprises:

a voltage-converter controller, coupled to the voltage converter for controlling the voltage converter;

a channel-enablement detector, coupled to the voltage-converter controller and the output channel terminals; and a plurality of detecting current sources, coupled to the output channel terminals;

wherein at the initiation of the LED driving circuit, the channel-enablement detector detects whether respective voltages of the output channel terminals are changed by the detecting current sources and accordingly detects whether the output channel terminals are coupled to the LED groups or coupled to the reference voltage, respectively.

9. The LED driving circuit according to claim 8, wherein the controller further comprises a plurality of current sources coupled to the output channel terminals.

10. The LED driving circuit according to claim 9, wherein at the initiation of the LED driving circuit, the output channel terminals are charged or discharged by the current sources, and the channel-enablement detector compares a voltage of each of the output channel terminals with a detection voltage to detect whether the output channel terminals are coupled to the LED groups or the reference voltage, respectively.

11. The LED driving circuit according to claim 9, wherein after an initial detection ends, the detecting current sources are powered off, and the current sources corresponding to the one or more output channel terminals coupled to the LED groups are powered on.

12. The LED driving circuit according to claim 1, wherein at the initiation of the LED driving circuit, voltages of the output channel terminals coupled to the reference voltage are changed towards the reference voltage, and voltages of the output channel terminals coupled to the LED groups are changed conversely.

13. A light emitting diode (LED) driving circuit for driving a plurality of LED groups, each LED group including one or more LEDs, the LED driving circuit comprising:

a voltage converter, for converting an input voltage into an output voltage, the output voltage coupled to a respective first terminal of each of the LED groups; and a controller, coupled to the voltage converter for controlling the voltage converter and including a plurality of output channels respectively having a plurality of output channel terminals, wherein at an initiation of the LED driving circuit, before the LED driving circuit has started to operate, the controller detects whether the output channels are used to drive one or more of the LED groups or unused so as to drive none of the LED groups, respectively, and controls the voltage converter to generate the output voltage based on a result of the detection.

14. The LED driving circuit according to claim 13, wherein each of the output channel terminals is coupled to a respective second terminal of at least one of the LED groups or a reference voltage according to whether the corresponding output channel is used or unused, if the corresponding output channel is used, the output channel terminal thereof is coupled to the respective second terminal of the at least one LED group, and if the corresponding output channel is unused, the output channel thereof is coupled to the reference voltage.

15. The LED driving circuit according to claim 13, wherein the controller ignores one or more unused ones of the output channels and controls the voltage converter to generate the output voltage based on respective voltages of the output channel terminals corresponding to one or more used ones of the output channels.

16. The LED driving circuit according to claim 15, wherein the controller controls the voltage converter to generate the output voltage based on a minimum value among the voltages of the output channel terminals corresponding to the one or more used ones of the output channels.

17. The LED driving circuit according to claim 13, wherein at the initiation of the LED driving circuit, the controller further turns off output currents of one or more unused ones of the output channels based on the result of the detection.

18. The LED driving circuit according to claim 13, wherein the controller detects respective voltages of the output channel terminals so as to detect whether the output channels are used or unused, respectively.

19. The LED driving circuit according to claim 13, wherein the controller further comprises:

a voltage-converter controller, coupled to the voltage converter for controlling the voltage converter;

a channel-enablement detector, coupled to the voltage-converter controller and the output channel terminals; and a plurality of detecting current sources, coupled to the output channel terminals;

wherein at the initiation of the LED driving circuit, the channel-enablement detector detects whether a plurality of voltages of the output channel terminals are changed by the detecting current sources and accordingly detects whether the corresponding output channels are used or unused, respectively.

20. The LED driving circuit according to claim 19, wherein the controller further comprises a plurality of current sources coupled to the output channel terminals.

21. The LED driving circuit according to claim 20, wherein at the initiation of the LED driving circuit, the output channel terminals are charged or discharged by the current sources and the channel-enablement detector compares a voltage of each of the output channel terminals with a detection voltage to detect whether the corresponding output channel is used or unused.

22. The LED driving circuit according to claim 20, wherein after an initial detection ends, the detecting current sources are powered off, and the current sources corresponding to one or more used ones of the output channels are powered on.

23. The LED driving circuit according to claim 13, wherein at the initiation of the LED driving circuit, the controller performs the detection by detecting that voltages of the output channel terminals corresponding to one or more unused ones of the output channels are changed towards a reference voltage, and voltages of the output channel terminals corresponding to one or more used ones of the output channels are changed conversely.

24. A light emitting diode (LED) driving method, comprising:

converting an input voltage into an output voltage for coupling to a respective first terminal of each of a plurality of LED groups, each LED group including one or more LEDs; and at an initiation of an LED driving circuit having a plurality of output channels respectively having a plurality of output channel terminals, each of the output channels being used to drive one or more of the LED groups or unused so as to drive none of the LED groups, before the LED driving circuit has started to operate, starting to detect whether the output channels are used or unused, respectively, and controlling the converting step to generate the output voltage based on a result of the detection.

25. The LED driving method according to claim 24, wherein each of the output channel terminals is coupled to a respective second terminal of at least one of the LED groups or a reference voltage according to whether the corresponding output channel is used or unused, if the corresponding output channel is used, the output channel terminal thereof is coupled to the respective second terminal of the at least one LED group, and if the corresponding output channel is unused, the output channel thereof is coupled to the reference voltage.

26. The LED driving method according to claim 24, wherein the generation of the output voltage based on the result of the detection comprises:

ignoring one or more unused ones of the output channels; and generating the output voltage based on respective voltages of the output channel terminals corresponding to one or more used ones of the output channels.

27. The LED driving method according to claim 26, wherein the generation of the output voltage based on the respective voltages of the output channel terminals corresponding to the one or more used ones of the output channels comprises:

generating the output voltage based on a minimum value among the voltages of the output channel terminals corresponding to the one or more used ones of the output channels.

28. The LED driving method according to claim 24, further comprising:

at the initiation of the LED driving circuit, turning off output currents of one or more unused ones of the output channels based on the result of the detection.

29. The LED driving method according to claim 24, further comprising:

detecting respective voltages of the output channel terminals so as to detect whether the corresponding output channels are used or unused, respectively.

30. The LED driving method according to claim 24, further comprising:

at the initiation of the LED driving circuit, charging or discharging the output channel terminals; and comparing a voltage of each of the output channel terminals with a detection voltage so as to detect whether the corresponding output channel is used or unused.

31. The LED driving method according to claim 24, the step of the detection is realized by detecting that voltages of the output channel terminals corresponding to one or more unused ones of the output channels are changed towards a reference voltage, and voltages of output channel terminals of the LED driving circuit corresponding to one or more used ones of the output channels are changed conversely.

32. A light emitting diode (LED) driving method, comprising:

at an initiation of an LED driving circuit having a plurality of output channels respectively having a plurality of output channel terminals, before the LED driving circuit has started to operate, detecting whether the output channels of the LED driving circuit are used to drive one or more of LED groups or unused so as to drive none of the LED groups respectively, each LED group including one or more LEDs; and turning off output currents of one or more unused ones of the output channels based on a result of the detection.

33. The LED driving method according to claim 32, wherein each of the output channel terminals is coupled to a respective second terminal of at least one of the LED groups or a reference voltage according to whether the corresponding output channel is used or unused, if the corresponding output channel is used, the output channel terminal thereof is coupled to the respective second terminal of the at least one LED group, and if the corresponding output channel is unused, the output channel thereof is coupled to the reference voltage.

34. The LED driving method according to claim 33, further comprising:

at the initiation of the LED driving circuit, charging or discharging the output channel terminals; and comparing a voltage of each of the output channel terminals with a detection voltage so as to detect whether the corresponding output channel is used or unused.

35. The LED driving method according to claim 32, further comprising:

detecting respective voltages of the output channel terminals so as to detect whether the output channels are used or unused, respectively.

36. The LED driving method according to claim 32, the step of the detection is realized by detecting that voltages of the output channel terminals corresponding to the one or more unused ones of the output channels are changed towards a reference voltage, and voltages of output channel terminals corresponding to one or more used ones of the output channels are changed conversely.

37. An electronic device, comprising:

a plurality of light emitting diode (LED) groups, each LED group including one or more LEDs; and an LED driving circuit for driving the LED groups, by converting an input voltage into an output voltage for coupling to a respective first terminal of each of the LED groups, and the LED driving circuit including a plurality of output channels respectively having a plurality of output channel terminals, wherein one or more of the output channels are used to drive one or more of the LED groups and one or more of the output channels are unused so as to drive none of the LED groups, wherein each of the output channel terminals is coupled to a respective second terminal of at least one of the LED groups or a reference voltage according to whether the corresponding output channel is used or unused, wherein if the corresponding output channel is used, the output channel terminal thereof is coupled to the respective second terminal of the at least one LED group, and if the corresponding output channel is unused, the output channel thereof is coupled to the reference voltage;

wherein at an initiation of the LED driving circuit, before the LED driving circuit has started to operate, the LED driving circuit detects whether the output channels are coupled to the LED groups or to the reference voltage, respectively, and generates the output voltage based on a result of the detection.

38. The electronic device according to claim 37, wherein the LED driving circuit ignores the one or more output channel terminals coupled to the reference voltage and generates the output voltage based on respective voltages of the one or more output channel terminals coupled to the LED groups.

39. The electronic device according to claim 37, wherein at the initiation of the LED driving circuit, the LED driving circuit further turns off output currents of the one or more output channel terminals coupled to the reference voltage based on the result of the detection.

40. The electronic device according to claim 37, wherein at the initiation of the LED driving circuit, voltages of the output channel terminals coupled to the reference voltage are changed towards the reference voltage, and voltages of the output channel terminals coupled to the LED groups are changed conversely.

41. An electronic device comprising:

a plurality of light emitting diode (LED) groups, each LED group including one or more LEDs; and an LED driving circuit for driving the LED groups, by converting an input voltage into an output voltage, the output voltage coupled to a respective first terminal of each of the LED groups, and the LED driving circuit including a plurality of output channels respectively having a plurality of output channel terminals, wherein at an initiation of the LED driving circuit, before the LED driving circuit has started to operate, the LED driving circuit detects whether the output channels are used to drive one or more of the LED groups or unused so as to drive none of the LED groups, respectively and generates the output voltage based on a result of the detection.

42. The electronic device according to claim 41, wherein each of the output channel terminals is coupled to a respective second terminal of at least one of the LED groups or a reference voltage according to whether the corresponding output channel is used or unused, if the corresponding output channel is used, the output channel terminal thereof is coupled to the respective second terminal of the at least one LED group, and if the corresponding output channel is unused, the output channel thereof is coupled to the reference voltage.

43. The electronic device according to claim 41, wherein the LED driving circuit ignores one or more unused ones of the output channels and generates the output voltage based on respective voltages of the output channel terminals respectively corresponding to one or more used ones of the output channels.

44. The electronic device according to claim 41, wherein at the initiation of the LED driving circuit, the LED driving circuit further turns off output currents of one or more unused ones of the output channels based on the result of the detection.

45. The electronic device according to claim 41, wherein at the initiation of the LED driving circuit, voltages of the output channel terminals corresponding to one or more unused ones of the output channels are changed towards a reference voltage, and voltages of the output channel terminals corresponding to one or more used ones of the output channels are changed conversely.

46. An electronic device comprising:

a plurality of light emitting diode (LED) groups, each LED group including one or more LEDs; and an LED driving circuit for driving the LED groups, including a plurality of output channels respectively having a plurality of output channel terminals, wherein at an initiation of the LED driving circuit, before the LED driving circuit has started to operate, the LED driving circuit detects whether the output channels are used to drive one or more of the LED groups or unused so as to drive none of the LED groups, respectively, and turns off output currents of one or more unused ones of the output channels based on a result of the detection.

47. The electronic device according to claim 46, wherein each of the output channel terminals is coupled to a respective second terminal of at least one of the LED groups or a reference voltage according to whether the corresponding output channel is used or unused, if the corresponding output channel is used, the output channel terminal thereof is coupled to the respective second terminal of the at least one LED group, and if the corresponding output channel is unused, the output channel thereof is coupled to the reference voltage.

48. The electronic device according to claim 46, wherein at the initiation of the LED driving circuit, voltages of the output channel terminals corresponding to the one or more unused ones of the output channels are changed towards a reference voltage, and voltages of the output channel terminals corresponding to one or more used ones of the output channels are changed conversely.

* * * * *